United States Patent [19]

Bye

[11] 4,046,955

[45] Sept. 6, 1977

[54] PROTEINACEOUS ADHESIVE COMPOSITION

[75] Inventor: Carolyn N. Bye, Cinnaminson, N.J.

[73] Assignee: National Casein of New Jersey, Riverton, N.J.

[21] Appl. No.: 631,821

[22] Filed: Nov. 14, 1975

[51] Int. Cl.² .................. B32B 27/06; C08L 89/00
[52] U.S. Cl. .................. 428/479; 106/124; 106/135; 106/146; 106/161; 428/475; 428/478; 428/537; 428/920
[58] Field of Search ............ 428/479, 478, 537, 920, 428/475; 106/124, 161, 135, 146

[56] References Cited

U.S. PATENT DOCUMENTS

| 1,851,954 | 3/1932 | Dike | 428/479 |
|---|---|---|---|
| 1,955,075 | 4/1934 | Lienig | 106/124 |
| 2,014,167 | 9/1935 | Bowen | 106/124 |
| 2,044,466 | 6/1936 | Cleveland | 428/479 |
| 2,247,633 | 7/1941 | Hearn | 106/161 |
| 3,305,431 | 2/1967 | Peterson | 428/479 |

OTHER PUBLICATIONS

"Protein Adhesives," Encyclo. of Poly Sci and Tech., vol. 11, pp. 678–688, John Wiley & Sons, Inc., N.Y., N.Y., 1969.
"Furfuryl Alcohol," Encyclo. of Chem. Tech., vol. 10, pp. 245–247, 1966, Kirk–Othmer.
Mellan, Ibert, Industrial Solvents, p. 523, 2nd Ed., 1950 Reinhold Pub. Corp., N.Y., N.Y.

Primary Examiner—Ellis Robinson
Attorney, Agent, or Firm—Max R. Millman

[57] ABSTRACT

A proteinaceous adhesive composition in which a dry mix comprised of protein, solubilizing agents and fillers is added to water containing furfuryl alcohol at the time of use. The adhesive composition is especially useful in joining untreated and fire-retardant-treated porous substrates to fire-retardant-treated porous substrates and provides advantages of improved bond strength and increased assembly time.

10 Claims, No Drawings

PROTEINACEOUS ADHESIVE COMPOSITION

This invention relates to proteinaceous adhesive compositions, more particularly to casein type glues especially adapted for joining untreated and fire-retardant-treated porous substrates to fire-retardant-treated porous substrates.

Many building codes now require that construction with wood components thereof, particularly doors, be treated with fire-retardant chemicals. Such fire doors, as they are known in the trade, generally comprise a fire-resistant core, a wood framing made of stiles and rails around the core, which stiles and rails have been treated with the fire-retardant chemicals and an untreated or fire-retardant-treated wood skin which is glued to the stiles and rails.

The primary object of this invention is to provide a relatively inexpensive, commercially practicable proteinaceous adhesive with improved bond strength and/or increased assembly time for gluing aforementioned wood skins to the fire-retardant-treated door frame stiles and rails.

Another object of the invention is to provide a proteinaceous adhesive with improved bond strength and/or increased assembly time for gluing untreated wood substrates to fire-retardant wood substrates, untreated wood substrates to untreated wood substrates and fire-retardant-treated substrates to fire-retardant-treated substrates.

Another object of the invention is to provide a proteinaceous adhesive composition whose bond strength is improved or remains the same even though the protein content is reduced to a predetermined value.

Another object of this invention is to provide a proteinaceous adhesive composition which reduces the gelling or coagulating effect which fire-retardant chemicals have on proteinaceous adhesives, and as a result, said adhesives will, on being spread upon a fire-retardant-treated substrate, remain fluid longer and will be capable of a good bond when pressure is applied, thus enabling one to increase assembly time without the inherent possibility of pre-cure.

Another object of this invention is to provide a proteinaceous adhesive composition which is versatile enough also to bond two untreated porous substrates to each other so that one adhesive system is adequate for many combinations of substrates which frequently appear in a single assembly line.

The foregoing objects are obtained with an adhesive composition comprised essentially of two major components, one a dry mix of the protein with solubilizing agents, fillers and preservatives added and the other, water, to which furfuryl alcohol has been added, the dry protein mix being added to the aqueous furfuryl alcohol mixture in proportions and for a time necessary to produce a homogeneous adhesive mixture for cold press or hot press application to the surfaces of various porous substrates to be joined. The preferred protein is casein although mixtures of casein, compatible soluble blood and soy protein may also be used as the protein source, as will appear hereinafter. The cold press application is preferred because of easier adaptation to assembly line production, but the adhesive also performs well in hot press applications.

As is well known, casein glue is made up of acid precipitated casein in a fine granular state, 30 mesh and finer, mixed with suitable solubilizing agents. This glue is supplied dry and mixed at the time of use with water. The casein solubilizing agents generally consist of lime (calcium hydroxide) plus sodium salts, including sodium carbonate, sodium oxalate, sodium tartrate, sodium citrate, sodium salicylate, sodium phosphate (tri-sodium phosphate and sodium hexametaphosphate), sodium fluoride, sodium sulfite, sodium arsenate, sodium arsenite, sodium stannate, sodium bicarbonate, sodium chloride, sodium borate; or any convenient sodium salt of an acid whose calcium salt is relatively insoluble may be used, provided that it is not hygroscopic and will not react with the lime or casein as long as the mixture is kept dry. Sutermeister, E., *Casein and Its Industrial Application*, ACS Monograph Series, The Chemical Catalog Co. Inc. NY, NY 1927 p. 176 et seq., particularly pages 179, 180 and 186, which is herein incorporated by reference.

The dry mix casein glue can also include such ingredients as light mineral oil, fillers, e.g., various clays, wood and shell flours, dextrins, celluloses and other materials used as extenders and viscosity modifiers; anti-foam agents; preservatives; zinc oxide or oxides of heavy metals; soluble blood; and soy protein.

As will appear more particularly hereinafter, the dry mix casein glues were formulated with various combinations of the aforesaid commonly used salts and varying levels of lime. Sodium pentachlorophenate was used as a preservative in all. A number of formulations included fillers for the purpose of increasing viscosity, which fillers were wood flour and bentonite, i.e., one cellulosic and one clay type. Some formulations included soy protein and/or soluble blood as an additional source of protein. It was found that an adhesive composition in accordance with the instant invention with improved dry shear bond strength and/or increased assembly time comprises about 8.0 to 22.9% protein, preferably 13.0 to 20.0%, and 1.0 to 35.0% furfuryl alcohol, preferably 5.0 to 20.0%, by weight based on the wet mix.

The upper limit of 22.9% of the protein content is determined by the limitations of incorporating the components other than protein which are required to make a glue with acceptable working properties as to mixing, solubilizing, viscosity, and usable pot life. Thus, while the upper limit of 22.9% may be exceeded with possible increased bond strength, the viscosity would be increased and the pot life would be shortened. Also, economics militates against use of a protein content in excess of 22.9%.

It was found that normal conditions for joining the substrates with the instant adhesive composition were 25 minutes cold press time and 1-3 days cure time prior to machining. At the lower protein content of about 8-10%, it was found advantageous to increase press time to one hour and allow up to seven days cure-out before machining.

Regarding the furfuryl alcohol content, the amount which may be incorporated is inversely proportional to the protein content. The upper limit of 35.0% furfuryl alcohol is determined by solubility factors, i.e., the available $H_2O$ in the system for dispersion of the protein; and by the working properties, i.e., mixing factors, viscosity, and pot life of the glue. As the said upper limit is approached and exceeded, the solubility of the protein becomes increasingly more incomplete to the point of reducing bond strength and, also, the pot life of the glue is shortened to an extent which makes the glue difficult to handle. At the lower limit of 1.0% furfuryl alcohol, the bond and working properties of the adhesive composition are good. Below said lower limit, no significant improvement in bond strength and/or increase in assembly time is obtained.

Inasmuch as one of the main objects of the instant adhesive composition is to produce a strong bond with increased assembly time between a fire-retardant-treated porous substrate and an untreated porous substrate, although the adhesive is also capable of producing a strong bond and increased assembly time between fire-retardant-treated porous substrates and between untreated porous substrates, it would be well at this point to set forth the manner in which porous substrates, such as wood, are treated to render them fire retardant.

Fire-retardant chemicals have been known for at least a half century and these include mono and di-ammonium phosphate, ammonium sulfate, zinc chloride, borax and boric acid. See "Fire-Retardant-Treated Wood" by H. W. Eickner in *ASTM Journal of Materials* Vol. 1, No. 3, Sept. 1966, pp. 625-643 which is herein incorporated by reference. Typical formulations of these salts are given in the *American Wood Preservers Association (AWPA) Standard* P10-68 and the general practice in the fire-retardant treatment of lumber is described in *AWPA Standard* C20-63, which are also herein incorporated by reference.

These fire-retardant treatments fall into two groups, those which give an acid water leach and those which give a basic water leach. See Holmes, C. A. and Meyers, G. C. "Fire-Retardant Treatments for Dry-Formed Hardboard" *Forest Products Journal,* Vol. 25, No. 1, pp. 20-22 (Jan. 1975) which is also herein incorporated by reference. The group giving the acid water leach is incompatible with casein glue to the extent that the assembly time would be reduced and the subsequent bond would be inferior. Koppers Company, Inc. of Pittsburgh, Pa. markets a fire-retardant-treated wood under the trademark Non-Com which is currently in widespread use as stiles and rails for fire door frames. Non-Com is produced by impregnating soft maple, birch, or other wood at relatively high temperatures and pressures with a composition determined by analysis to contain the following: after 7 hours soaked in water at room temperature, solids removed = 8.1%; pH = 4.1%; sulfates ($SO_4$) = 3.6%; ammonia ($NH_3$) = 1.4%; phosphorus (P) = 0.07%, fluoride = none; calcium = <0.1%. The leach and ash were subjected to spectrographic analysis which showed the presence of sodium, calcium, phosphorus and boron; magnesium, manganese and iron as trace elements, and the absence of copper, zinc, chromium and halogens.

Thus, it appears that the Non-Com lumber is impregnated with a composition comprising ammonium phosphate, ammonium sulfate and boric acid. As indicated in the analysis Non-Com lumber is the type which gives an acid water leach (pH = 4.1) and, as noted by Eickner at p. 639, for this type of fire-retardant-treated lumber, casein glue is inferior. The acidic nature of certain types of fire-retardant treatments is believed to have an effect on the gelling of casein glue when this glue is spread on lumber treated with a combination of chemicals which is acid in nature.

While the instant adhesive composition has been employed to bond wood to fire-retardant Non-Com lumber and Non-Com fire-retardant lumber to itself, it will be understood that it is within the purview of the invention that the instant adhesive composition is useful in bonding other fire-retardant-treated woods or porous substrates. It is also within the purview of this invention that the instant adhesive composition is useful in bonding untreated wood or other porous substrates to each other, and fire-retardant-treated wood or other porous substrates to each other especially those which yield an acid water leach.

The following are illustrative but non-limitative examples of the adhesive compositions of the instant invention and control compositions for comparative tests as to bond strength and gel times.

EXAMPLE 1

A dry mix base composition B was formulated as follows, in parts by weight:

| | |
|---|---|
| Casein, ground acid type, 84% protein | 63.0 |
| Light mineral oil | 5.0 |
| Lime, hydrated | 19.9 |
| Sodium fluoride | 4.9 |
| Trisodium phosphate | 7.2 |
| Total | 100.0 |

Using the base dry casein mix B, control adhesive compositions were formulated wherein the dry casein mix was added to water with agitation, allowing about 20-30 minutes for the casein to be dispersed and again agitating to produce a homogeneous mix. The proportions of ingredients in parts by weight are given in the following examples 2-17.

EXAMPLE 2

| | |
|---|---|
| Base dry casein mix B | 47.3 |
| Sodium pentachlorophenate | 3.2 |
| Wood flour | 17.0 |
| Bentonite | 25.0 |
| Total Dry | 92.5 |
| Water | 219.5 |
| Total Wet | 312.0 |
| % Casein | 9.6 |
| % Protein from casein | 8.0 |

In the comparative test results hereinafter, this control is designated C-1.

EXAMPLE 3

| | |
|---|---|
| Base dry casein mix B | 44.9 |
| Sodium pentachlorophenate | 3.6 |
| Wood flour | 16.0 |
| Bentonite | 22.0 |
| Soluble blood, 92.6% protein | 1.4 |
| Total Dry | 87.9 |
| Water | 224.1 |
| Total Wet | 312.0 |
| % Casein | 9.1 |
| % Protein from casein | 7.6 |
| % Soluble blood | 0.4 |
| % Protein from blood | 0.4 |
| Total % protein | 8.0 |

In the comparative test results hereinafter, this control is designated C-2.

EXAMPLE 4

| | |
|---|---|
| Base dry casein mix B | 44.9 |
| Sodium pentachlorophenate | 3.6 |
| Wood flour | 14.0 |
| Bentonite | 20.0 |
| Staley I-200 soy flour, 53% protein | 2.4 |
| Total Dry | 84.9 |
| Water | 227.1 |
| Total Wet | 312.0 |

-continued

| | |
|---|---|
| % Casein | 9.1 |
| % Protein from casein | 7.6 |
| % Soy flour | 0.8 |
| % Protein from soy | 0.4 |
| Total % protein | 8.0 |

In the comparative test results hereinafter, this control is designated C-3.

EXAMPLE 5

| | | |
|---|---|---|
| Base dry casein mix B | | 76.5 |
| Sodium pentachlorophenate | | 3.5 |
| Wood flour | | 20.0 |
| | Total Dry | 100.0 |
| Water | | 200.0 |
| | Total Wet | 300.0 |
| % Casein | | 16.1 |
| % Protein from casein | | 13.5 |

In the comparative test results hereinafter, this control is designated C-4.

EXAMPLE 6

| | | |
|---|---|---|
| Base dry casein mix B | | 96.5 |
| Sodium pentachlorophenate | | 3.5 |
| Bentonite | | 8.0 |
| | Total Dry | 108.0 |
| Water | | 192.0 |
| | Total Wet | 300.0 |
| % Casein | | 20.3 |
| % Protein from casein | | 17.0 |

In the comparative test results hereinafter, this control is designated C-5.

EXAMPLE 7

| | | |
|---|---|---|
| Base dry casein mix B | | 93.1 |
| Sodium pentachlorophenate | | 3.0 |
| Bentonite | | 3.9 |
| | Total Dry | 100.0 |
| Water | | 163.5 |
| | Total Wet | 263.5 |
| % Casein | | 22.3 |
| % Protein from casein | | 18.7 |

In the comparative test results hereinafter, this control is designated C-6.

EXAMPLE 8

| | | |
|---|---|---|
| Base dry casein mix B | | 97.4 |
| Sodium pentachlorophenate | | 2.6 |
| | Total Dry | 100.0 |
| Water | | 125.0 |
| | Total Wet | 225.0 |
| % Casein | | 27.3 |
| % Protein from casein | | 22.9 |

In the comparative test results hereinafter, this control is designated C-7.

EXAMPLE 9

| | | |
|---|---|---|
| Base dry casein mix B | | 96.8 |
| Sodium pentachlorophenate | | 3.8 |
| Bentonite | | 12.0 |
| Soluble blood, 92.6% protein | | 7.0 |
| | Total Dry | 119.6 |
| Water | | 210.4 |
| | Total Wet | 330.0 |
| % Casein | | 18.5 |
| % Protein from casein | | 15.5 |

-continued

| | |
|---|---|
| % Soluble blood | 2.1 |
| % Protein from blood | 2.0 |
| Total % protein | 17.5 |

In the comparative test results hereinafter, this control is designated C-8.

EXAMPLE 10

A base dry casein mix B-1 was formulated as follows in parts by weight:

| | | |
|---|---|---|
| Casein, ground acid type, 84% protein | | 66.7 |
| Light mineral oil | | 4.0 |
| Lime, hydrated | | 17.3 |
| Sodium fluoride | | 5.3 |
| Sodium carbonate | | 6.7 |
| | Total | 100.0 |

EXAMPLE 11

The control adhesive, which is designated hereafter in the test results as C-9, was formulated as follows:

| | | |
|---|---|---|
| Base dry casein mix B-1 | | 96.3 |
| Sodium pentachlorophenate | | 3.7 |
| Bentonite | | 4.0 |
| | Total Dry | 104.0 |
| Water | | 221.0 |
| | Total Wet | 325.0 |
| % Casein | | 19.8 |
| % Protein from casein | | 16.6 |

EXAMPLE 12

A base dry casein mix B-2 was formulated as follows in parts by weight:

| | | |
|---|---|---|
| Casein, ground acid type, 84% protein | | 70.9 |
| Light mineral oil | | 4.4 |
| Lime, hydrated | | 8.5 |
| Sodium fluoride | | 2.8 |
| Trisodium phosphate | | 9.0 |
| Sodium sulfite | | 4.4 |
| | Total | 100.0 |

EXAMPLE 13

The control adhesive, which is designated hereafter in the test results as C-10, was formulated as follows:

| | | |
|---|---|---|
| Base dry casein mix B-2 | | 96.0 |
| Sodium pentachlorophenate | | 4.0 |
| Wood flour | | 4.0 |
| | Total Dry | 104.0 |
| Water | | 236.0 |
| | Total Wet | 340.0 |
| % Casein | | 20.0 |
| % Protein from casein | | 16.8 |

EXAMPLE 14

A base dry casein-soy mix, B-3, was formulated in parts by weight:

| | |
|---|---|
| Casein, ground acid type, 84% protein | 52.0 |
| Purina PROCOTE, 86.25% Protein | 14.2 |
| Light mineral oil | 3.4 |
| Lime, hydrated | 16.1 |
| Sodium fluoride | 4.9 |
| Trisodium phosphate | 6.3 |
| Sodium sulfite | 3.1 |

-continued

| | |
|---|---|
| Total | 100.0 |

EXAMPLE 15

The control adhesive, which is designated hereafter in the test results as C-11, was formulated as follows:

| | | |
|---|---|---|
| Base dry casein-soy mix B-3 | | 96.5 |
| Sodium pentachlorophenate | | 3.5 |
| | Total Dry | 100.0 |
| Water | | 200.0 |
| | Total Wet | 300.0 |
| % Casein | | 16.7 |
| % Protein from casein | | 14.0 |
| % Isolated soy protein | | 4.6 |
| % Protein from soy | | 4.0 |
| Total % protein | | 18.0 |

EXAMPLE 16

A dry casein-soy blood mix, B-4, was formulated in parts by weight:

| | | |
|---|---|---|
| Casein, ground acid type, 84% protein | | 36.0 |
| Staley I-200 soy flour, 53% protein | | 24.0 |
| Soluble blood, 92.6% protein | | 2.0 |
| Light mineral oil | | 2.6 |
| Lime, hydrated | | 18.0 |
| Sodium fluoride | | 2.5 |
| Tri-sodium phosphate | | 7.6 |
| Sodium sulfite | | 3.8 |
| Sodium pentachlorophenate | | 3.5 |
| | Total | 100.0 |

EXAMPLE 17

The control adhesive, which is designated hereafter in the test results as C-12, was formulated as follows:

| | | |
|---|---|---|
| Dry casein-soy-blood mix B-4 | | 100.0 |
| Water | | 230.0 |
| | Total Wet | 330.0 |
| % Casein | | 10.9 |
| % Soy Flour | | 7.3 |
| % Soluble blood | | 0.6 |
| % Protein from casein | | 9.2 |
| % Protein from soy flour | | 3.9 |
| % Protein from soluble blood | | 0.6 |
| Total % protein | | 13.7 |

The following are non-limitative examples of the adhesive compositions of the instant invention, the amounts being given in parts by weight.

EXAMPLE 18

| | | |
|---|---|---|
| Base dry casein mix B | | 76.5 |
| Sodium pentachlorophenate | | 3.5 |
| Wood flour | | 20.0 |
| | Total Dry | 100.0 |
| Furfuryl alcohol | | 75.0 |
| Water | | 125.0 |
| | Total Wet | 300.0 |
| % Casein | | 16.1 |
| % Protein from casein | | 13.5 |
| % Furfuryl alcohol | | 25.0 |

The furfuryl alcohol was added to the water, and then with agitation, the dry mix was added and allowed to sit for 20 to 30 minutes to disperse the casein, after which the glue was mixed again for a time sufficient to form a homogeneous mix ready for application to substrates to be joined. Although this mixing procedure is preferred for the above Example 18, viscosity limitations permitting, the alcohol can be added to the dry mix and water combination after the glue has gone through the dispersing period. Alternatively, addition of the ingredients can be effected by adding one-half the quantity of the dry mix to the water, then adding the furfuryl alcohol and, finally, adding the remaining dry mix.

This adhesive composition is designated A-1 in the test results hereinafter.

EXAMPLE 19

| | | |
|---|---|---|
| Base dry casein mix B | | 97.4 |
| Sodium pentachlorophenate | | 2.6 |
| | Total Dry | 100.0 |
| Furfuryl alcohol | | 11.3 |
| Water | | 113.7 |
| | Total Wet | 225.0 |
| % Casein | | 27.3 |
| % Protein from casein | | 22.9 |
| % Furfuryl alcohol | | 5.0 |

This adhesive is designated A-2 in the test results hereinafter and the ingredients are mixed and added in the manner described in Example 18.

EXAMPLE 20

| | | |
|---|---|---|
| Base dry casein mix B | | 89.6 |
| Sodium pentachlorophenate | | 3.0 |
| Bentonite | | 7.4 |
| | Total Dry | 100.0 |
| Furfuryl alcohol | | 30.5 |
| Water | | 123.2 |
| | Total Wet | 253.7 |
| % Casein | | 22.3 |
| % Protein from casein | | 18.7 |
| % Furfuryl alcohol | | 12.0 |

This adhesive is designated A-3 in the test results hereinafter and the ingredients thereof are mixed and added in the same manner as described in Example 18.

EXAMPLE 21

| | | |
|---|---|---|
| Base dry casein mix B | | 76.5 |
| Sodium pentachlorophenate | | 3.5 |
| | Total Dry | 80.0 |
| Furfuryl alcohol | | 105.0 |
| Water | | 115.0 |
| | Total Wet | 300.0 |
| % Casein | | 16.1 |
| % Protein from casein | | 13.5 |
| % Furfuryl alcohol | | 35.0 |

This adhesive is designated A-4 in the test results hereinafter and the ingredients thereof are mixed and added in the same manner as described in Example 18.

EXAMPLE 22

| | | |
|---|---|---|
| Base dry casein mix B | | 96.8 |
| Sodium pentachlorophenate | | 3.8 |
| Bentonite | | 20.0 |
| Soluble blood, 92.6% protein | | 7.0 |
| | Total Dry | 127.6 |
| Furfuryl alcohol | | 39.6 |
| Water | | 162.8 |
| | Total Wet | 330.0 |
| % Casein | | 18.5 |
| % Protein from casein | | 15.5 |
| % Soluble blood | | 2.1 |
| % Protein from blood | | 2.0 |
| Total % protein | | 17.5 |
| % Furfuryl alcohol | | 12.0 |

This adhesive is designated A-5 in the test results hereinafter and the ingredients thereof are mixed and added in the same manner as described in Example 18.

EXAMPLE 23

| Base dry casein mix B | | 96.5 |
|---|---|---|
| Sodium pentachlorophenate | | 3.5 |
| Bentonite | | 18.0 |
| | Total Dry | 118.0 |
| Furfuryl alcohol | | 24.0 |
| Water | | 158.0 |
| | Total Wet | 300.0 |
| % Casein | | 20.3 |
| % Protein from casein | | 17.0 |
| % Furfuryl alcohol | | 8.0 |

This adhesive is designated A-6 in the test results hereinafter and the ingredients thereof are mixed and added in the same manner as described in Example 18.

EXAMPLE 24

| Base dry casein mix B | | 96.5 |
|---|---|---|
| Sodium pentachlorophenate | | 3.5 |
| Bentonite | | 12.0 |
| | Total Dry | 112.0 |
| Furfuryl alcohol | | 3.0 |
| Water | | 185.0 |
| | Total Wet | 300.0 |
| % Casein | | 20.3 |
| % Protein from casein | | 17.0 |
| % Furfuryl alcohol | | 1.0 |

This adhesive is designated A-7 in the test results hereinafter and the ingredients thereof are mixed and added in the same manner as described in Example 18.

EXAMPLE 25

| Base dry casein mix B | | 47.3 |
|---|---|---|
| Sodium pentachlorophenate | | 3.6 |
| Bentonite | | 22.0 |
| | Total Dry | 72.9 |
| Furfuryl alcohol | | 78.0 |
| Water | | 161.1 |
| | Total Wet | 312.0 |
| % Casein | | 9.6 |
| % Protein from casein | | 8.0 |
| % Furfuryl alcohol | | 25.0 |

This adhesive is designated A-8 in the test results hereinafter and the ingredients thereof are mixed and added in the same manner as described in Example 18.

EXAMPLE 26

| Base dry casein mix B | | 44.9 |
|---|---|---|
| Sodium pentachlorophenate | | 3.6 |
| Wood flour | | 16.0 |
| Bentonite | | 26.0 |
| Soluble blood (92.6% protein) | | 1.4 |
| | Total Dry | 91.9 |
| Furfuryl alcohol | | 78.0 |
| Water | | 142.1 |
| | Total Wet | 312.0 |
| % Casein | | 9.1 |
| % Protein from casein | | 7.6 |
| % Soluble blood | | 0.4 |
| % Protein from blood | | 0.4 |
| Total % protein | | 8.0 |
| % Furfuryl alcohol | | 25.0 |

This adhesive is designated as A-9 in the test results hereinafter and the ingredients thereof are mixed and added in the same manner as described in Example 18.

EXAMPLE 27

| Base dry casein mix B | | 44.9 |
|---|---|---|
| Sodium pentachlorophenate | | 3.6 |
| Wood flour | | 16.0 |
| Bentonite | | 26.0 |
| Staley I-200 soy flour, 53% protein | | 2.4 |
| | Total Dry | 92.9 |
| Furfuryl alcohol | | 78.0 |
| Water | | 141.0 |
| | Total Wet | 312.0 |
| % Casein | | 9.1 |
| % Protein from casein | | 7.6 |
| % Soy flour | | 0.8 |
| % Protein from soy | | 0.4 |
| Total % protein | | 8.0 |
| % Furfuryl alcohol | | 25.0 |

This adhesive is designated as A-10 in the test results hereinafter and the ingredients thereof are mixed adn added in the same manner as described in Example 18.

EXAMPLE 28

| Base dry casein mix B-1 | | 96.3 |
|---|---|---|
| Sodium pentachlorophenate | | 3.8 |
| Bentonite | | 11.5 |
| | Total Dry | 111.5 |
| Furfuryl alcohol | | 39.0 |
| Water | | 174.5 |
| | Total Wet | 325.0 |
| % Casein | | 19.8 |
| % Protein from casein | | 16.6 |
| % Furfuryl alcohol | | 12.0 |

This adhesive is designated A-11 in the test results hereinafter and the ingredients thereof are mixed and added in the same manner as described in Example 18.

EXAMPLE 29

| Base dry casein mix B-2 | | 96.0 |
|---|---|---|
| Sodium pentachlorophenate | | 4.0 |
| Wood flour | | 16.0 |
| | Total Dry | 116.0 |
| Furfuryl alcohol | | 40.8 |
| Water | | 183.2 |
| | Total Wet | 340.0 |
| % Casein | | 20.0 |
| % Protein from casein | | 16.8 |
| % Furfuryl alcohol | | 12.0 |

This adhesive is deignated A-12 in the test results hereinafter and the ingredients thereof are mixed and added in the same manner as described in Example 18.

EXAMPLE 30

| Base dry casein-soy mix B-3 | | 88.8 |
|---|---|---|
| Sodium pentachlorophenate | | 3.2 |
| Wood flour | | 8.0 |
| | Total Dry | 100.0 |
| Furfuryl alcohol | | 38.6 |
| Water | | 139.4 |
| | Total Wet | 278.0 |
| % Casein | | 16.7 |
| % Protein from casein | | 14.0 |
| % Isolated soy protein | | 4.6 |
| % Protein from isolated soy protein | | 4.0 |
| Total % protein | | 18.0 |
| % Furfuryl alcohol | | 13.9 |

This adhesive is designated A-13 in the test results hereinafter and the ingredients thereof are mixed and added in the same manner as described in Example 18.

EXAMPLE 31

| | |
|---|---|
| Dry casein-soy-blood mix B-4 | 100.0 |
| Furfuryl alcohol | 50.0 |
| Water | 180.0 |
| Total Wet | 330.0 |
| % Casein | 10.9 |
| % Soy flour | 7.3 |
| % Soluble blood | 0.6 |
| % Protein from casein | 9.2 |
| % Protein from soy flour | 3.9 |
| % Protein from soluble blood | 0.6 |
| Total % protein | 13.7 |
| % Furfuryl alcohol | 15.2 |

This adhesive is designated A-14 in the test results hereinafter and the ingredients thereof are mixed and added in the same manner as described in Example 18.

The instant adhesives of Examples 18-31 were tested against the controls of Examples 2-17 for bond strength and gel time. The results are set forth in the Table to follow.

For each gluing the instant adhesives and the controls were held at a viscosity range of 500 to 20,000 cp at 77° F ± 5 F. Gel times were determined by laying two strips of masking tape, ⅛ inch apart, across a 1 ½ inch width block of Non-Com treated soft maple, a fire-retardant-treated wood (FRW). A film of the adhesive was spread across the surface resulting in a film the thickness of the masking tape, i.e. .005 inches. The film was examined at ¼ minute intervals until it lost its tackiness. The gel time was recorded in minutes, accurate to ¼ minute.

The procedure for testing bond strength of birch to fire-retardant wood (FRW) was that of ASTM-D-906-64 (1970) modified as to the specimen preparation only. A 3-ply construction was used, FRW to birch to FRW, employing the 162 inch wide surface of the FRW stile which was cut to a 12 inch length before gluing and was trimmed to a ⅛ inch thickness before testing. This is the actual surface to be glued in a fire door. The shears were cut to glue line dimensions of ⅞ in. by 1 ⅛ in., or 1 sq. in. of glue line subjected to the tension of a Teco-Mater Shear Tester. In testing the bond strength of birch to FRW under hot press conditions, this same construction was used, except the FRW was trimmed to a thickness of ⅛ inch before applying the glue and placing under pressure.

In testing the bond strength of FRW to FRW, the procedure of ASTM-D-905-49 (1970) was used, modified as to specimen preparation only. A 2-ply construction was used employing a surface of 1 ½ in. by 12 in. The blocks were cut to give glue line dimensions of 1 ½ in. by 1 ½ in., a glue line area of 2.25 sq. in. subjected to compression on a Dillon block shear tester. The value obtained was computed to 1 in.² and then multiplied by 90%, the normal procedure followed when a block of 2.25 sq. in. is used instead of a 3 in. sq. block.

In testing the bond strength of birch to birch shears for both hot press and cold press, the procedure of ASTM-D-906-64 (1970) was followed.

TABLE

| | | | | SHEAR (Psi) and WOOD FAILURE (%) | | | | |
|---|---|---|---|---|---|---|---|---|
| | | | | Cold Press | | | Hot Press | |
| Adhesives Tested | % Protein | % Furfuryl Alcohol | Gel Time (min.) | B-FRW | FRW-FRW | B-B | B-FRW | B-B |
| A-1 | 13.5 | 25 | 1 | 805-33 | 1480-0 | 584-25 | 695-81 | 574-0 |
| A-2 | 22.9 | 5 | 1 | 536-98 | 1005-0 | | | |
| A-3 | 18.7 | 12 | 2-3 | 442-74 | 1475-0 | 616-0 | 750-23 | 659-3 |
| A-4 | 13.5 | 35 | 1¼ | 431-31 | 1252-0 | 615-43 | 789-57 | 583-25 |
| A-5 | 17.5 | 12 | 2 | 826-63 | 1572-0 | | | |
| A-6 | 17.0 | 8 | 1¼ | 413-75 | 1824-0 | | | |
| A-7 | 17.0 | 1 | ¾ | 447-49 | 1140-0 | 555-22 | 637-100 | 602-6 |
| A-8 | 8 | 25 | 1 | 467-56 | 1120-0 | | | |
| A-9 | 8 | 25 | 1 | 582-0 | 764-0 | | | |
| A-10 | 8 | 25 | 1 | 540-3 | 708-0 | | | |
| A-11 | 16.6 | 12 | 1¼ | 373-50 | 1292-0 | | | |
| A-12 | 16.8 | 12 | 2¼ | 612-0 | 1585-0 | | | |
| A-13 | 18 | 13.9 | 2 | 353-88 | 1516-0 | | | |
| A-14 | 13.7 | 15.2 | 1¼ | 355-58 | 1452-0 | | | |
| C-1 | 8.0 | 0 | ¼ | 265-0 | 790-0 | | | |
| C-2 | 8.0 | 0 | ¼ | 503-21 | 400-0 | | | |
| C-3 | 8.0 | 0 | ¼ | 523-10 | 104-0 | | | |
| C-4 | 13.5 | 0 | ¼ | 295-83 | 753-0 | 231-0 | 580-74 | 452-33 |
| C-5 | 17.0 | 0 | ¼ | 360-0 | 840-0 | 514-8 | 665-100 | 573-10 |
| C-6 | 18.7 | 0 | ¼ | 380-100 | 650-0 | 517-0 | 578-95 | 558-0 |
| C-7 | 22.9 | 0 | ¼ | Unspreadable | | | | |
| C-8 | 17.5 | 0 | ¼ | 774-13 | 585-0 | | | |
| C-9 | 16.6 | 0 | ¼ | 341-18 | 440-0 | | | |
| C-10 | 16.8 | 0 | ¼ | 398-1 | 296-0 | | | |
| C-11 | 18.0 | 0 | ¼ | 335-17 | 172-0 | | | |
| C-12 | 13.7 | 0 | ¼ | 243-0 | 670-0 | | | |

Shear values (left hand cols.)
Wood failure (right hand cols.)
B = Birch
FRW = Fire-retardant wood (Non-Com)

In the birch to FRW tests, the spread rate in pounds per thousand square feet of single glue line (lbs/msgl) was 60, the closed assembly time (min.) was 20-30, the pressure (psi) was 150, the press time (min.) was 25-60, the cure-out time before machining (days) was 1-7, before testing (days) was 7, and the number of test specimens 6-8.

In the FRW to FRW tests the conditions were the same as those for birch to FRW except that the closed assembly time (min.) was 20, the cure-out time before machining (days) was 3-7, the cure-out time before testing (days) was 7, and the number of test specimens was 4–5.

In the birch to birch tests, the spread rate (lbs/msgl) was 60, the closed assembly time (min.) was 45, the pressure (psi) was 150, the press time (min.) was 25 and the cure-out time before machining (days) was 7 as was the cure-out time before testing. The number of test specimens was 10. The aforementioned tests were run in the cold press.

In the hot press birch to birch tests, conditions were the same as for the cold press birch to birch except that the hot press time (min.) was 3 and temperature was 255° F.

In the hot press birch to FRW tests, conditions were the same as for the cold press birch to FRW tests except that the hot press time (min.) was 10, the temperature was 255° F, the closed assembly time (min.) was 30; cure-out time (days) before machining was 7 and before testing was 7.

Thus, it will be seen that an aqueous proteinaceous adhesive composition is provided including furfuryl alcohol which is relatively inexpensive and which is an effective glue for joining porous substrates, particularly untreated wood and fire-retardant-treated wood to fire-retardant-treated wood, especially wood treated with fire retardants that yield an aqueous acid leach.

While preferred embodiments have been disclosed herein, it will be understood that skilled artisans may make variations without departing from the spirit of the invention.

What is claimed is:

1. A two-part adhesive composition consisting essentially of one part comprising a dry mix of acid precipitated casein including solubilizing agents, and a second part comprising water and furfuryl alcohol to which the dry mix is added to form an aqueous homogeneous adhesive ready for application to substrates to be joined, the furfuryl alcohol being present in an amount of about 1.0% to about 35.0% by weight and the casein being present in an amount to supply a protein content of about 8.0% to about 22.9% by weight based upon the weight of the overall aqueous adhesive composition.

2. The adhesive composition of claim 1 wherein the protein content is about 13.0 to about 20.0% by weight and the furfuryl alcohol content is about 5.0 to about 20.0% by weight.

3. A structure comprising two wood product substrates bonded together by the adhesive composition of claim 1 in a cured condition.

4. The structure of claim 3 wherein at least one substrate is impregnated with fire-retardant chemicals.

5. The structure of claim 4 wherein the fire-retardant chemicals include sulfate, ammonium, phosphorus and boron compounds and yield an aqueous acid leach.

6. A two-part adhesive composition consisting essentially of one part comprising a dry mix of acid precipitated casein including solubilizing agents and soluble blood, and a second part comprising water and furfuryl alcohol to which the dry mix is added to form an aqueous homogeneous adhesive ready for application to substrates to be joined, the furfuryl alcohol being present in an amount of about 1.0% to about 35.0% by weight and the casein and soluble blood being present in an amount to supply a protein content of about 8.0% to about 22.9% by weight based upon the weight of the overall aqueous adhesive composition, the protein content of the soluble blood being up to about 2% by weight of the overall aqueous adhesive composition.

7. A two-part adhesive composition consisting essentially of one part comprising a dry mix of acid precipitated casein including solubilizing agents and soy, and a second part comprising water and furfuryl alcohol to which the dry mix is added to form an aqueous homogeneous adhesive ready for application to substrates to be joined, the furfuryl alcohol being present in an amount of about 1.0% to about 35.0% by weight and the casein and soy being present in an amount to supply a protein content of about 8.0% to about 22.9% by weight based upon the weight of the overall aqueous adhesive composition, the protein content of the soy being up to about 4% by weight of the overall aqueous adhesive composition.

8. A two-part adhesive composition consisting essentially of one part comprising a dry mix of acid precipitated casein including solubilizing agents and soluble blood and soy, and a second part comprising water and furfuryl alcohol to which the dry mix is added to form an aqueous homogeneous adhesive ready for application to substrates to be joined, the furfuryl alcohol being present in an amount of about 1.0% to about 35.0% by weight and the casein and soluble blood and soy being present in an amount to supply a protein content of about 8.0% to about 22.9% by weight based upon the weight of the overall aqueous adhesive composition, the protein content of the soluble blood and soy combined being up to about 4.5% by weight of the overall aqueous adhesive composition.

9. A multi-part adhesive composition consisting essentially of a dry mix of acid precipitated casein including solubilizing agents, water and furfuryl alcohol which are mixed to form an aqueous homogeneous adhesive ready for application to substrates to be joined, the furfuryl alcohol being present in an amount of about 1.0% to about 35.0% by weight and the casein being present in an amount to supply a protein content of about 8.0% to about 22.9% by weight based upon the weight of the overall aqueous adhesive composition.

10. A substantially homogeneous adhesive composition consisting essentially of acid precipitated casein, including solubilizing agents, furfuryl alcohol and water ready for application to substrates to be joined, the furfuryl alcohol being present in an amount of about 1.0% to about 35.0% by weight and the casein being present in an amount to supply a protein content of about 8.0% to about 22.9% by weight.

* * * * *